April 3, 1962 A. D. COLE ET AL 3,028,595
RADAR GUIDANCE SYSTEM
Filed Feb. 10, 1955 2 Sheets-Sheet 1

INVENTORS
ADDISON D. COLE
JOHN B. LEVIN
NICHOLAS REPELLA
BY Joseph Weingarten
ATTORNEY April 3, 1962      A. D. COLE ET AL      3,028,595
RADAR GUIDANCE SYSTEM
Filed Feb. 10, 1955      2 Sheets-Sheet 2
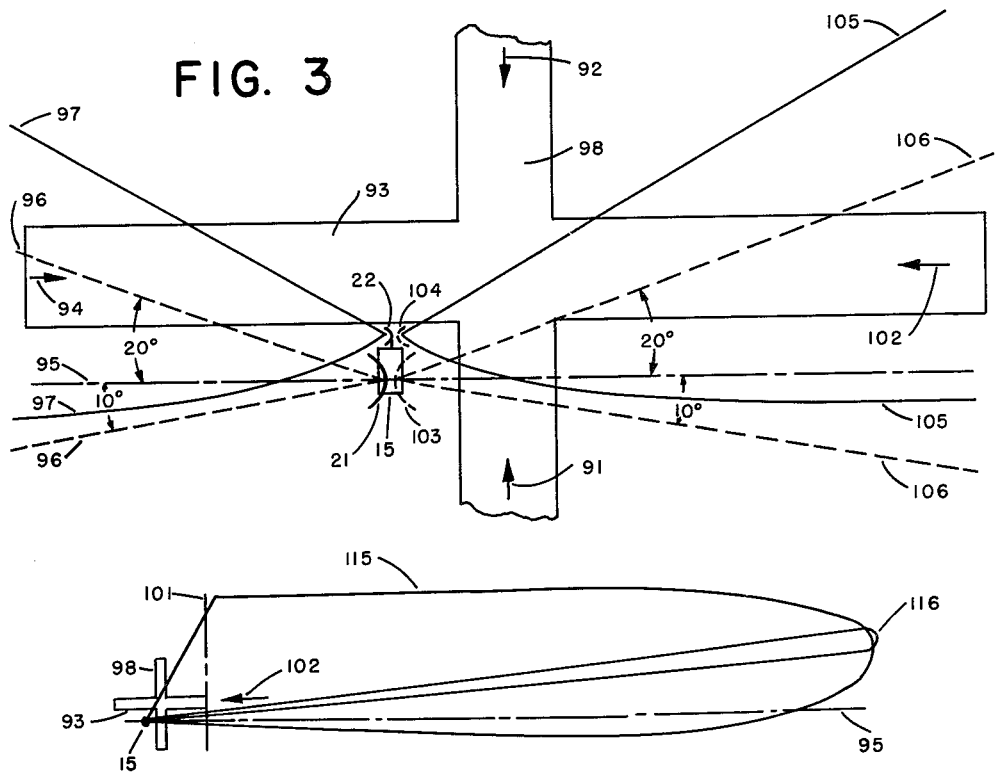
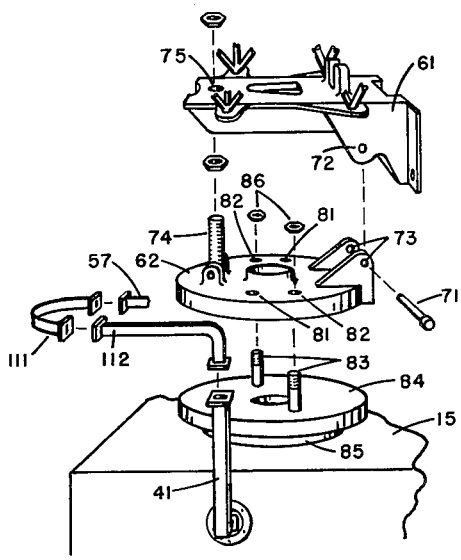
INVENTORS
ADDISON D. COLE
JOHN B. LEVIN
NICHOLAS REPELLA
BY Joseph Weingarten
ATTORNEY 3,028,595
RADAR GUIDANCE SYSTEM
Addison D. Cole, Natick, John B. Levin, Cambridge, and Nicholas Repella, Natick, Mass., assignors to Laboratory for Electronics, Inc., Boston, Mass., a corporation of Delaware
Filed Feb. 10, 1955, Ser. No. 487,372
16 Claims. (Cl. 343—100)

The present invention relates in general to radar systems and more particularly to a novel portable precision approach radar antenna structure offering reliable performance together with extreme ease of fabrication, assembly, siting, and adjustment, all at a cost far below that for apparatus heretofore used to perform a comparable function.

Broadly speaking a precision approach radar, also known as ground controlled approach or GCA, functioning as a low-visibility aircraft landing aid, consists of a radar arranged alternately to search through intersecting horizontal and vertical sectors in a selected volume of space. Through appropriate electronic circuitry the vertical searching or elevation antenna displays the range of an aircraft under observation and its relationship to a predetermined course line known as the glide slope. In a corresponding manner the horizontal or azimuth antenna provides an indication of the range and left-right deviation of the aircraft from a course defined by an extension of the runway centerline and known as the localizer path.

By means of a suitable communications link, range, height and deviations from either course line are relayed to the pilot of the plane being landed, so that a course accurately aimed at touchdown may be maintained. Under one customary procedure, the pilot will observe GCA instructions up to the point where the runway becomes visible, and then execute a normal visual landing; but with the precision available from present-day radar apparatus, it has become possible to perform landings under conditions of essentially zero visibility with complete safety.

There are now available numerous electronic techniques by which the data gathered by a precision approach radar system may be displayed. Of these the "az-el" presentation appears as a pair of sector scans, adjacently disposed on the face of the cathode ray tube screen. A more recent device, known as the "beta-scan" exhibits the course lines and targets under observation on a pair of adjacent B-scans, and offers the distinct advantage of improved accuracy at low range. The exact nature of the radar display, however, is not critical to an understanding of the present invention and this brief discussion has been intended merely to furnish some background information as to the general status of the art.

Unlike the localizer and glide slope antennas of an instrument landing system (ILS) which are positioned directly on, and have symmetrical radiation patterns about, the runway centerline when viewed in the horizontal plane, a precision approach radar system must be sited at a point offset from the runway. It therefore follows that if coverage is to be equally effective on each side of the runway centerline, the radiation pattern of the elevation antenna in the horizontal plane will be asymmetrical with reference to a line parallel to the runway centerline and passing through the site of the antenna system of the precision approach radar. Furthermore, in view of the asymmetry of the antenna site with respect to the runway centerline, the azimuth antenna preferably should search further to the runway side of the aforesaid reference line through the site, than to the opposite side.

The nature of the ground controlled approach radar antenna system is to a considerable extent determinative of the siting problem. Heretofore, it has been the practice to utilize a pair of relatively fixed directional antenna reflectors illuminated by a pair of stationary waveguide-fed linear dipole arrays. By mechanically oscillating a waveguide wall in each feed to correspondingly vary the phase velocity within the guide, a cyclic shift in relative phasing between radiating dipoles was achieved, with the result that the antenna radiation pattern searched through a sector in space. And since operation at one side of the runway was necessary, it was also the practice to design both the azimuth and elevation antenna reflecting surfaces to yield different radiation patterns and search angles.

These prior design concepts, however, led to certain obvious disadvantages. The fabrication of complex conductive reflective surfaces is an inherently costly process, and the need for two distinctive shapes significantly increased manufacturing expenses. Further, because of technical problems related to the possibility of breakdown between adjacent dipoles under high-power operation, it was found necessary to limit the sweep angle of the radiation pattern to a value which would encompass little else besides targets in the immediate vicinity of the correct glide path. For this reason it has been customary to require an independent search radar at each precision approach installation, with the attendant objectionable aspect of additional costs for equipment and skilled operators. Finally, and perhaps most important from the point of view of precluding use of prior equipment for other than relatively immobile, permanent installations were the problems encountered when, it became desirable to control approaches from the opposite direction on a given runway, or to initiate control on an adjacent or intersecting runway.

The seriousness of the latter problem will perhaps be better appreciated by expanding the discussion of the procedures involved when siting a precision approach system. As mentioned earlier, an asymmetrical radiation pattern in the horizontal plane was found preferable for the elevation antenna. Taking this pattern as acceptable for landings in one direction, it will be seen that merely to turn this antenna through a half-circle at the same site would not correspondingly accommodate landings in the opposite direction, since the radiation pattern while still asymmetrical, is now effectively inverted, and rather than enhancing runway coverage, actually diminishes the scope of radar coverage in the desired region. Thus, accommodation of a landing in the direction opposite to that for which the equipment had been initially oriented, required moving the entire installation to the other side of the runway. While this was possible with those GCA units installed in truck trailers, the time and effort which would have to be expended was so great that as a rule the units were permanently used to accommodate landings in a single direction only.

The present invention contemplates and has as a primary object the provision of a novel precision approach radar antenna system which not only overcomes the enumerated disadvantages of prior apparatus, but features in addition, compactness, portability, minimum siting time and an unusual degree of adaptability to the needs of landing systems for airports with small or high traffic density and for the complete range of aircraft including piston or jet-engined, fixed or rotary winged types. Basically, apparatus constructed in accordance with this invention when once sited at an airport will permit controlled landings in either direction on the adjacent runway, or in either direction on intersecting or reasonably remote runways. Direction changes when necessary may be achieved with minimum time loss and without the need for moving the entire antenna pedestal, while maintaining optimum directional radiation patterns.

Basically, the present antenna comprises a number of key members which may rapidly be assembled or disassembled at the selected site. Among these are a supporting frame, a housing which is rotatably attached thereto, and a pair of like antennas detachably secured to oscillating members; that is, they may be secured to or rapidly detached from oscillating members actuated by a drive mechanism compactly disposed within the housing.

The reflecting surfaces of both antennas and the feeds therefor, are of the same design. This not only minimizes costs, but reduces the spare parts inventory, which is highly advantageous in certain tactical applications of the equipment. To meet the coverage specifications, the reflecting surface is arranged so that when in use for elevation coverage, substantially equal energies are available about the touchdown point in a direction parallel to the localizer path. The same reflecting surface when in use for azimuth search, provides a desirable narrow symmetrical pattern in the horizontal plane, fanned in elevation, to insure radar coverage at all altitudes in which targets may reasonably be expected.

With this arrangement, the antenna may be permanently installed at an airport, or may be carried disassembled, to any airport where and when the need arises. Having once levelled the antenna pedestal, and appropriately oriented the reflectors relative to the selected touchdown point, aircraft control may proceed without further adjustment until a direction change becomes essential. Assuming there is a requirement for reverse operation on the same runway, it is then merely necessary to lift and reverse the antennas on their housing mounts, and the equipment may be returned to service. It will be seen that reversal of the azimuth antenna will not change the fan beam coverage, while reversal of the elevation antenna will invert the asymmetrical pattern with retention of proper runway coverage.

It is therefore another object of this invention to provide a precision approach radar antenna in which opposite orientation may be obtained simply through reversal of two like antennas.

Another object is to provide mechanical means facilitating rapid and unerroneous reversal of the antenna elements. A further object is to furnish a novel mechanical expedient whereby when antenna reversal is needed, an angular change of less than 180 degrees is possible to permit more desirable coverage of the approach pattern.

By virtue of the rotational coupling between housing and supporting members, the effort involved in readjustment for intersecting runways is substantially negligible. Taking a runway which intersects at right angles, for example, it is merely necessary to rotate the housing 90 degrees, for landing in one direction; or to rotate 90 degrees and reverse antennas for the opposite direction. Other angles are generally accommodated in a like manner.

Another object of the present invention is to provide an antenna structure which not only is adapted to precision approach service, but may readily be utilized for air surveillance and airport taxi control. By modification of the mechanical drive, this apparatus may also be arranged to provide complete azimuth search, with the elevation antenna serving to derive height data on all targets in view.

It is a still further object of this invention to provide the aforementioned advantages and others for ground controlled approach systems with a material increase in dependability and safety in the operation being performed. These and other objects and advantages of this invention will become apparent from the following specification with reference to the accompanying drawing in which:

FIG. 3 is a diagrammatic representation of the entire structure shown in FIG. 1 sited with respect to the intersecting runway pattern of an airport, and illustrates the coverage which may be achieved;

Figure 2:
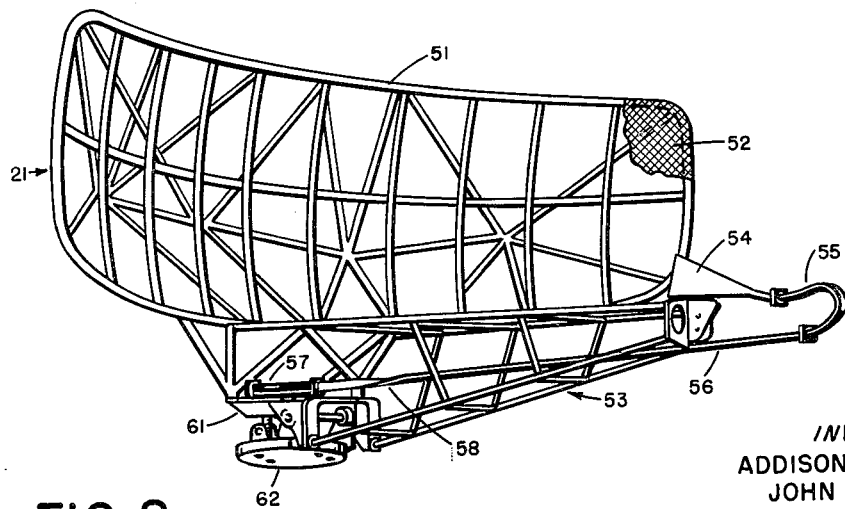
FIG. 2 is a detailed perspective view of one of the antennas of the assembly shown in FIG. 1, both antennas being of like design and construction.

FIG. 4 is an exploded view of the antenna drive and support and illustrates the manner in which the antenna reflectors may rapidly be adjusted to adapt the system for coverage of both landing directions for a selected runway; and FIG. 5 is a graphical illustration of the radiation patterns of the antenna of FIG. 2 in mutually perpendicular planes overlaid on a reduced scale runway pattern of FIG. 3.

Figure 1:
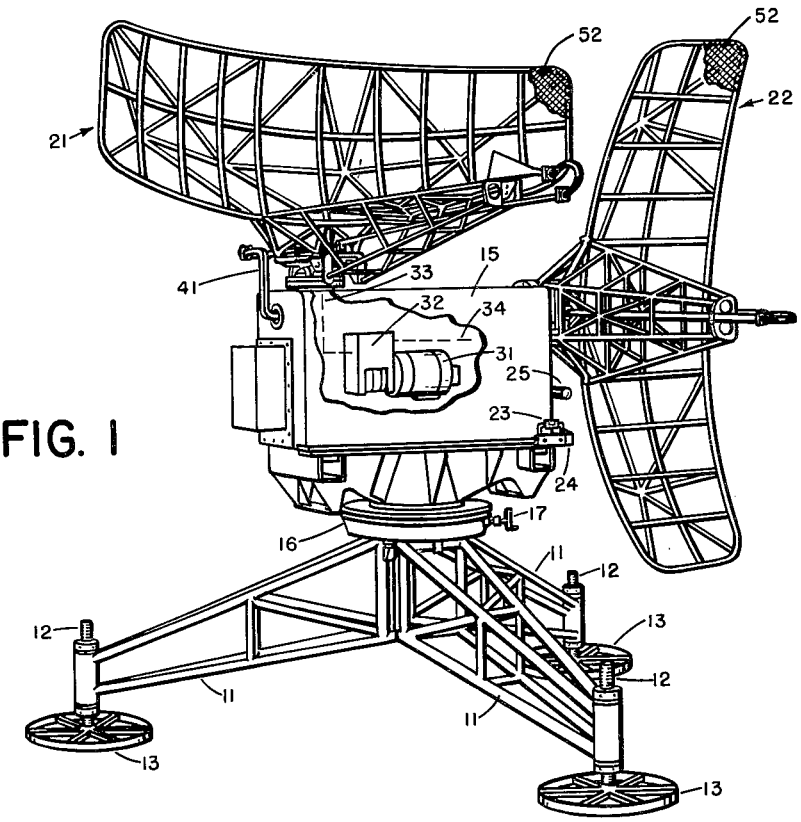
FIG. 1 is a general front view of the antenna system illustrating the manner in which the various structural elements thereof appear when assembled.

With reference now to the drawing, and more particularly to FIG. 1, thereof, there is shown an assembled antenna structure incorporating the basic features of the present invention. Basically, the antenna supporting pedestal is a tripod consisting of separable legs 11 of welded construction which furnish the needed rigidity and load carrying capacity with minimum weight. At the outer end of each leg a threaded shaft 12 supports a disc 13, permitting independent adjustment of the height of each leg. Details of the manner in which the tripod legs are assembled have been omitted, but it should be noted that transportation of the entire unit is greatly facilitated by breakdown into component parts.

Radar antenna housing 15 is supported upon the tripod by a turntable 16, in such a manner that the angular position of the housing may be controlled by rotation of hand crank 17. Continuous rotation in either direction is possible, so that the housing, and all equipment affixed thereto, may be rotated through a complete revolution if desired.

Completing the basic assembly are azimuth and elevation antennas 21 and 22, respectively, both of which are supported upon housing 15 and driven in a manner to be described below. Suffice it to state at this juncture that the plane of motion of antenna 21, and the plane of motion of antenna 22, are respectively parallel and perpendicular to the plane of rotation established by turntable 16. Thus, when the latter plane is levelled, motion of antenna 21 will be confined to a horizontal plane, and antenna 22 to a vertical plane.

When the antenna structure shown in FIG. 1 is first assembled at the desired site, levelling is accomplished by adjustment of shafts 12 until the bubbles in crossed levels 23 and 24, which define a plane parallel to the plane of turntable 16, are centered. Thereafter, the established level relationship is maintained in all rotational positions about a vertical axis of the housing 15 with the attached antennas.

To complete the set-up operation, the angular position of the unit is fixed, as for example, by adjustment of hand crank 17 until a specified point is sighted through telescope 25 as discussed later. Thus, by use of the foregoing procedure, coverage of a desired sector of space by the azimuth and elevation antennas is obtained.

Before discussing the design details of antennas 21 and 22, it is believed appropriate to indicate the manner in which they are driven and the nature of the resulting motion. Thus, in FIG. 1, a portion of housing 15 has been broken away to expose an electric motor 31 which drives a transmission mechanism 32 from which suitable linkages, diagrammatically indicated by broken lines 33 and 34, extend to antennas 21 and 22 respectively. In this connection it should be mentioned that the precise structure of the motor and associated drive members has been omitted to avoid adding unnecessary detail to the drawing, particularly since the specific drive arrangement does not constitute a feature of the present invention. Suffice it to say that when motor 31 is actuated, linkages 33 and 34 are oscillated through predetermined sectors, there being arrangements for mutually independent adjustment of each angular sector, and that this motion is transmitted to antennas 21 and 22, respectively. Of some importance is the fact that since a single radar transmitter and receiver combination (not shown) is used for both antennas 21 and 22, the pattern of motion established is such that the antennas alternately "look" at the respective sectors of space under surveillance. The required radar electronic apparatus may be arranged within or beyond housing 15, or may be assembled in a separate housing placed at some distance from the antenna structure shown in FIG. 1 and coupled thereto by a suitable microwave transmission line.

Since the horizontal and vertical scanning antennas need only provide data during alternate intervals of time, microwave switching means, driven by the scanning motor 31 may be used alternately to energize the respective feeds for these antennas. In FIG. 1 it is seen that microwave energy flows to and from antenna 21 through rectangular waveguide 41. A like waveguide, not visible in this figure, but which extends from the opposite side wall of housing 15, is used to couple energy to and from antenna 22. Waveguide 41 and its counterpart for antenna 22 converge within housing 15 at the microwave switching arrangement discussed generally above.

For a discussion now of the details of antennas 21 and 22, reference is now made to FIGS. 1 and 2, the latter being a detailed perspective view of azimuth scanning antenna 21 as it appears when detached from housing 15.

In accordance with the principles of this invention, both the azimuth and elevation antennas 21 and 22 are identical in design and construction, and hence are interchangeable. Therefore, it will be understood that whatever is said about the mechanical and electrical characteristics of azimuth antenna 21 in the discussion of FIG. 2 applies equally well to elevation antenna 22 shown in FIG. 1.

Specifically, antenna 21 is formed of a framework of tubular structural elements, this design being chosen for maximum strength, minimum wind resistance, and rigidity, with minimum weight, to facilitate antenna removal and transportation. An endless tubular member 51 defines the outer edge of, and supports the conductive reflecting screen 52, and an outwardly extending tubular framework 53 of generally pyramidal shape functions to support the reflector feed which includes a rectangular horn 54 situated at the reflector focus. Horn 54 is connected by flexible and rigid waveguide sections 55 and 56, respectively, to flexible input waveguide 57. For the purpose of rotating the plane of polarization through 90°, waveguide 56 is formed with a gradual twist 58 through a corresponding angle. When the antenna assembly shown in FIG. 2 is affixed to housing 15, and oscillated by the drive mechanism therein, flexible waveguide section 57 absorbs the angular motion, which is generally small, as will be noted below.

The tubular members constituting the framework which supports both antenna reflector and feed converge, and the framework is welded to support member 61, which in turn, is pivotally attached to disc-shaped base plate 62.

FIG. 4 discloses certain features important to an understanding of overall system operation, but may be advantageously referred to at this junction for a clearer view of several of the elements making up the antenna structure discussed in connection with FIG. 2. Specifically, FIG. 4 illustrates support member 61 to which the various tubular struts carrying the antenna reflecting screen and waveguide and horn feed are attached. By means of pin 71, which extends through aligned openings in lugs 72—72, integral with member 61, and through a mating set of protrusions 73—73 on base plate 62, a pivotal connection is obtained. When assembled, bolt 74 attached to plate 62 fits through opening 75 in member 61, and with suitable lock nuts, the angular position of the entire antenna, including feed, may be adjusted with hinge pin 71 as an axis, and then rigidly locked in the selected position. This arrangement thus allows the angular orientation of the radiation pattern of the antenna to be controlled with respect to base plate 62. Now referring back to FIG. 1 it may be seen that provision of this adjustment permits tilting antenna 21 relative to the horizontal plane established by the levelling operation earlier described, and that with respect to antenna 22, this adjustment offers means to control the angular displacement of its radiation pattern from a fixed vertical plane. Hence, the azimuth antenna 21 may be positioned so that the energy maximum of its radiation pattern is directed along the preset glide slope path. Note, however, that this adjustment does not in any manner affect the size or limits of the sector scanned.

As illustrated in FIG. 4, base plate 62 is provided with two pairs 81—81 and 82—82 of diametrically opposed circular openings, either pair of which precisely fits diametrically positioned studs 83—83, the latter extending from drive disc 84 which in turn is supported upon housing 15 by bearing plate 85. As discussed earlier in connection with FIG. 1, motor 31, through transmission 32, oscillates linkage 33. By suitable attachment (not shown), corresponding oscillatory motion is imparted to disc 84; consequently, when base plate 62 is set over studs 83, and fastened down by nuts 86, the entire antenna assembly will cyclically sweep through the predetermined scanning sector.

Since the azimuth and elevation antennas are interchangeable, similar drives are used for both. Accordingly apparatus such as shown in FIG. 4 is also used to drive antenna 22, the difference being only that the elevation antenna drive extends from the side rather than from the top of housing 15.

Having described the construction of the present precision approach system, an appreciation of the utility of such construction will be had from a consideration of FIGS. 3 and 5, which schematically illustrate a pair of crossed runways on enlarged and reduced scales, respectively. In FIG. 5, a pair of runways 93 and 98 are illustrated as intersecting at right angles, and in FIG. 3, that portion of FIG. 5 to the left of dot-dash line 101 is shown in an enlarged scale. While the runways are illustrated as intersecting at right angles, it will be understood that other angles of intersection will be encountered and that the invention is equally applicable to such other configurations. In FIG. 5, the approach system of the invention is shown sited at point 15 offset from both of runways 93 and 98, the pattern 115 being the radiation pattern of elevation antenna 22 as it appears in the horizontal plane, and curve 116 being the radiation pattern of azimuth antenna 21 as it appears in the horizontal plane. Antennas 21 and 22 having identical characteristics, as above-described, pattern 115 in the vertical plane corresponds to pattern 116, and pattern 116 in the vertical plane corresponds in shape to pattern 115 of FIG. 5.

It will be noted that the radiation pattern 115 in the horizontal plane is asymmetrical with reference to line 95, which is parallel to the center line of runway 93 and passes through point 15, thereby insuring equally effective search on each side of the runway centerline, and pattern 116 is oriented to search further to the runway side of reference line 95 than to the opposite side. Accordingly, an aircraft approaching the runway 93 in the direction indicated by arrow 102 will be illuminated by the radiation beams from both antennas throughout the approach path and until a selected touchdown point on runway 93 is reached.

While FIG. 5 shows the general operation of the system, a better understanding of the present invention will be had from an examination of FIG. 3 which more clearly demonstrates the effect of the foregoing asymmetries of the radiation patterns, particularly when the direction of approach is changed. In FIG. 3, the housing 15 is shown as a rectangle, sited on reference line 95, with antennas 21 and 22 mounted thereon and oriented to guide an aircraft approaching runway 93 in the direction of arrow 94 to a safe landing on the runway.

Telescope 25, mentioned earlier, but not shown in FIG. 3, is so mounted on housing 15, that its optical axis is normal to the two axes about which the azimuth and elevation antennas 21 and 22 oscillate. In initially siting the apparatus as in FIG. 3, the turntable housing support is rotated after leveling until the telescope axis lies parallel to the centerline of the runway where landing control is desired. As a practical matter, once the radar antenna site is selected, a number of stakes, one for each runway are so permanently positioned, that when viewed through telescope 25, the appropriate geometric disposition of the antenna structure is obtained for the associated runway.

Reference line 95 passes through the rotational axis of azimuth antenna 21; the antenna as it is oscillated by linkage 33, scanning a predetermined angular sector in the horizontal plane. In the illustrated example, the antenna 21 searches a 30° sector, between dotted lines 96—96, and in order to insure adequate coverage of the approach region on both sides of the runway, searches a larger sector to the runway side of reference line 95 than to the opposite side. In other words, the sector nearer the runway is 20° and the other sector is 10°. This scanning pattern coupled with the asymmetrical radiation pattern described in connection with FIG. 5 insures coverage of the approach region including the point of touchdown.

The solid lines 97 terminating at elevation antenna 22 represent a segment of the radiation pattern 115 in the horizontal plane, corresponding generally to the portion to the left of line 101 in FIG. 5. Because of the scale of FIG. 3, the entire radiation pattern 115 cannot be placed thereon, but the enlarged scale clearly illustrates the utility of the asymmetric radiation pattern in permitting elevation antenna 22 to be offset from the runway and yet provide adequate coverage of the approach region on both sides of the runway centerline. It will be noted that the radiated energy is concentrated in the approach region thereby providing the desired range with a minimum of radiated power. The radiation beam 115 being relatively narrow in the vertical dimension, vertical coverage of the approach region is obtained by scanning in elevation, this being done by oscillating antenna 22 in a vertical plane through linkage 34 (FIG. 1). For example, antenna 22 may be oscillated to search a 10° elevation sector, from 1° below the horizontal so as to illuminate the touchdown point, to 9° above the horizontal. Under the foregoing conditions, then, the system is in condition to guide an aircraft approaching in direction 94 to touchdown on runway 93.

Now, should landing conditions change, such as a wind shift, which necessitates the landing of aircraft in the direction of arrow 92, it is necessary only to rotate antenna housing 15 in a clockwise direction about its vertical axis until the aforementioned marker stake for that runway is sighted through telescope 25. When used on an airport having perpendicularly intersecting runways as illustrated, the housing 15 will be rotated through an angle of substantially 90°, and more generally, to a position where the axis of the telescope 25 is substantially parallel to the centerline of the landing runway. It will be apparent that simple rotation of the housing 15 in a clockwise direction through an appropriate angle will insure the same coverage of the approach region as described above so long as the antenna system is located to the right of the landing aircraft.

If, however, landing conditions require an approach to runway 93 in the direction 102, it will be apparent that the foregoing basic condition will not obtain, since the antenna system will then be to the left of the approaching aircraft. Of more significance, if antenna housing 15 is rotated about a vertical axis through an angle of 180° from the position shown in FIG. 3, the radiation patterns of antennas 21 and 22 will be effectively inverted. In spite of the inversion, azimuth antenna 21 would still give adequate fan beam coverage, but the asymmetry of the elevation radiation pattern would for practical purposes, eliminate radar coverage of the runway, making landing from direction 102 virtually impossible.

This apparent system limitation is readily overcome, with the precision approach system remaining at the site shown in FIG. 3, by virtue of the constructional features described above in connection with FIGS. 1, 2 and 4. To accommodate an approach from the direction of arrow 102, the housing 15 is left in the position first described, the antennas 21 and 22 are detached and reversed on their respective housing mounts. That is, azimuth antenna 21 is detached from housing 15 and reassembled in the position illustrated in dotted lines at 103. In a similar manner, elevation antenna 22 is detached and reassembled in position 104. Thus, instead of the radiation patterns being inverted, they are in the same positions relative to the approach runway as originally, the section scanned by the azimuth antenna being bounded by broken lines 106, and that part of the elevation pattern in the horizontal plane corresponding to the region bounded by lines 97 being relocated in the region bounded by lines 105. It will be seen, then, that reversal of azimuth antenna 21 to position 103 does not change the fan beam coverage, while reversal of elevation antenna 22 to position 104 inverts the asymmetrical pattern to retain proper runway coverage.

The manner in which antenna reversal is accomplished will be understood by again referring to FIG. 4. Azimuth antenna 21 and elevation antenna 22 are each normally secured to a disc 84, oscillatory motion being imparted to the azimuth disc by linkage 33, and to the elevation disc by linkage 34. In usual practice, the disc to which the azimuth antenna is secured oscillates through a sector of different angular magnitude than does the disc to which the elevation antenna is secured. In the present example, the azimuth disc 84 oscillates through a 30° sector, and the comparable disc to which the elevation antenna 22 is attached oscillates through a 10° sector.

In the description of FIG. 3, it was seen that the 30° azimuth sector was divided with 20° to the runway side of reference line 95 and 10° on the other side. It will be seen, however, that if, in reversing azimuth antenna 21 to the position 103, base plate 62 is rotated 180° with respect to azimuth disc 84, the oscillations of disc 84 through the same 30° sector would cause antenna 21 to search only a 10° sector on the runway side of reference line 95 and a 20° sector on the other side. To obtain scanning of the desired region, namely, 20° to the runway side of reference line 95, azimuth base plate 62 is accordingly rotated only 170° with respect to its disc 84. The advantages of the provision of two pairs of holes 81—81 and 82—82 in base plate 62 is at once apparent; they permit attachment of base plate 62 to disc 84 in at least two positions thereby permitting the antenna system to cover the approach regions at both ends of a runway without changing the site. In the present example, the angular spacing between diameters through holes 81—81 and 82—82 is 170°, it being understood that other angular spacings may be used should system site and runway orientation require.

Again, as was described in connection with FIG. 3, elevation antenna 22 preferably scans a 10° sector from 1° below the horizontal to cover the touchdown point, to 9° above the horizontal. However, if in reversing antenna 22 to position 104, its base plate 62 is rotated 180° with respect to its elevation disc 84, the oscillations of disc 84 through the same 10° sector would cause scanning 9° below the horizontal and 1° above, an obviously undesirable result. To overcome this objection and achieve the preferred searched sector, the base plate 62 to which elevation antenna 22 is attached is rotated only 172° with respect to its corresponding disc 84. Accordingly, the holes 81—81 and 82—82 in the elevation antenna base plate are angularly displaced from each other by 172°.

In one preferred form of the invention, linkage 33 is so arranged that azimuth antenna 21 searches a 19° sector to the runway side of reference line 95 and an 11° sector to the opposite side, again a total of 30°. In this case, then, the azimuth base plate 62 is rotated 172° with respect to the horizontal disc 84 in preparation for aircraft landing in the opposite direction on the same runway. Thus, the angular spacing between holes 81—81 and 82—82 of the azimuth base plate 62 is 172°, the same as that in elevation base plate 62 for a 10° sector with above-described asymmetry with respect to the horizontal. Hence, the two antennas are completely interchangeable, resulting in a considerable reduction in fabrication costs and spare parts inventory.

The procedure for reversing the position of antennas 21 and 22 can best be understood by further reference to FIG. 4. Assuming when the antennas have the orientation first described that studs 83—83 are secured in holes 82—82 by nuts 86—86 and waveguides 111, 112, 41 and 57 are connected, the first step consists of separating waveguide section 111 from waveguides 57 and 112. Nuts 86—86 are then removed, the antenna is lifted off studs 83—83 and rotated 172° until holes 81—81 are aligned with studs 83—83. After placing holes 81—81 over studs 83—83, nuts 86—86 are again tightened down, and the antenna structure reversal is complete. To complete reversal of the feed system, waveguide 112 is separated from waveguide 41, the long section thereof is rotated 180° in the horizontal plane, and guide 112 is resecured to guide 41. Reconnection of waveguide 111 to 57 and 112 completes the operation. While the foregoing description has been confined to reversal of the azimuth antenna, the same procedure is followed in changing the position of elevation antenna 22. It will be seen that the procedure is relatively simple, and in actual practice, two men have routinely accomplished changeover of both antennas in less than fifteen minutes.

Following the above-described reversal of the antennas from the positions 21 and 22 to positions 103 and 104 (FIG. 3), the system is in condition to accommodate a landing on runway 93 with an approach from the direction indicated by arrow 102, as above-described. If now, a change of landing condition necessitates an approach from the direction of arrow 91 and a landing on runway 98, it is necessary only to rotate the entire housing 15 through an appropriate angle, in the example, substantially 90°. Thus, it is seen that any airport runway system can be accommodated from a single location of the precision approach system, by simple rotating the entire housing 15 about a vertical axis through an appropriate angle, or by reversing the position of antennas 21 and 22 on the housing 15, or both.

The advantages of this novel antenna arrangement and the structure associated therewith are now apparent. The tripod with the adjustable feet along with the mutually perpendicular levels permit rapid and easy levelling of the antenna housing when initially siting at a new location. The complete rotatability in the horizontal plane of the antenna housing coupled with the means for detachably securing the two antennas permit rapid realignment of the system to land aircraft on any runway without resiting. The identical antennas reduce fabrication costs considerably. Efficient antenna design providing the radiation patterns discussed, that is a pattern asymmetrical in one plane and symmetrical in a perpendicular plane, results in lower power requirements for a given coverage and a consequent reduction in cost and weight. Moreover, by providing means for continuously rotating the azimuth antenna, a search system is obtained which permits target location at any azimuth prior to use of the precision approach facility.

Aided by the forementioned weight and cost reductions, an entire precision approach radar system utilizing the novel antenna system has been constructed light enough to be transportable by helicopter and at far less than the cost of prior less flexible systems. Yet the reliability, accuracy and coverage have been increased.

It is apparent that one skilled in the art may make numerous modifications and refinements in the particular embodiment described without departing from the novel concepts disclosed herein. Consequently, the present invention should be construed as limited only by the spirit and scope of the appended claims.

What is claimed is:

1. For use with a precision approach radar system, an antenna supporting structure, and a pair of substantially identical antennas each having an asymmetrical radiation pattern in one plane and a substantially symmetrical radiation pattern in a perpendicular plane, said antennas being attached to said supporting structure and arranged for oscillatory scanning motion about coplanar orthogonal axes.

2. For use with a precision approach radar system, an antenna supporting structure, a pair of like antennas attached to said supporting structure and arranged for oscillatory scanning motion about coplanar mutually perpendicular axes, each of said antennas being characterized by an asymmetrical radiation pattern in a plane including the respective scanning axis, and independent means for rotating said supporting structure and attached antennas in unison.

3. For use with a precision approach radar system, an antenna supporting structure, a pair of like antennas attached to said supporting structure and arranged for oscillatory scanning motion about coplanar mutually perpendicular axes, each of said antennas being characterized by an asymmetrical radiation pattern in a plane including the respective scanning axis, said supporting structure and attached antennas being independently rotatable about an axis parallel to one of said scanning axes, and additional means for adjusting the relative angular position of the aforesaid axis about which said supporting structure is rotatable.

4. For use with a precision approach radar system, an antenna structure having a pair of physically similar directional antennas each characterized by symmetrical and asymmetrical radiation patterns in mutually perpendicular planes, means associated with said structure for scanning the directional energy radiations of each of said antennas through predetermined overlapping sectors in space, and means on said structure cooperating with disengageable means carried by each of said antennas permitting each of said pair of antennas to be independently reoriented with respect to said structure for effectively reversing the direction of the sector of space scanned without alteration of the magnitude of the sector scanned by each, said disengageable means being arranged so that reversal of one of said antennas is effective to retain the aforesaid asymmetry in the radiation pattern thereof on the same side of said structure notwithstanding change in the direction of the sector scanned.

5. An antenna structure for use with a precision approach radar system comprising, a housing, a framework supporting said housing for rotation about a substantially vertical axis, first and second antenna supporting members extending from said housing, means within said housing for imparting oscillatory motion to said supporting members about substantially vertical and horizontal axes respectively, first and second directional antennas, coacting means associated with said antenna supporting members and said antennas for detachably securing said first and second antennas respectively to said first and second supporting members in either one of two substantially opposite orientations with respect to said structure, said first and second antennas each being thereby effective to scan through a predetermined angular sector whose direction with respect to said structure is determined by the orientation selected.

6. An antenna structure for use with a precision approach radar system comprising, a housing, a framework supporting said housing for rotation about a substantially vertical axis, first and second antenna supporting members extending from said housing, means within said housing for imparting oscillatory motion to said supporting members about substantially vertical and horizontal axes respectively, first and second directional antennas, coacting means associated with said antenna supporting members and said antennas for detachably securing said first and second antennas respectively to said first and second supporting members in either one of two substantially opposite orientations with respect to said structure, said first and second antennas each being thereby effective to scan through a predetermined angular sector whose direction with respect to said structure is determined by the orientation selected, and means associated with said first and second antennas permitting independent angular adjustment of each with respect to its oscillatory axis.

7. For use with a precision approach radar system for guidance of aircraft operations from a site offset from an airport runway, apparatus comprising, an antenna structure disposed at said site and having azimuth and elevation sector scanning directional antennas associated therewith, said azimuth antenna having a generally symmetrical radiation pattern in the horizontal plane and normally arranged for radar coverage of one end of said runway, said elevation antenna being normally arranged for radar coverage of the same end of said runway and having an asymmetrical radiation pattern in the horizontal plane with an energy distribution predominantly to the runway side of said antenna structure, and means for substantially reversing the orientation of said azimuth and elevation antennas with respect to said structure for radar coverage of the opposite end of said runway, reversal of said elevation antenna being effective to retain the predominant energy component of its asymmetrical radiation pattern on the runway side of said structure.

8. For use with a precision approach radar system for guidance of aircraft operations from a site offset from an airport runway, apparatus comprising, an antenna structure disposed at said site and having substantially identical azimuth and elevation directional antennas supported thereon for sector scanning about vertical and horizontal axes respectively, said structure and both antennas being normally sited for radar coverage of region including a glide path extending upward in the direction of one end of said runway, said azimuth and elevation antennas having similar symmetrical radiation patterns in planes perpendicular to the respective scanning axes and similar asymmetrical radiation patterns in vertical and horizontal planes respectively, said elevation antenna being arranged whereby its asymmetrical radiation pattern provides a predominant energy distribution on the runway side of said structure, means for detaching and substantially reversing the orientation of said azimuth and elevation antennas upon said antenna structure for radar coverage of a glide path extending upward in the direction of the opposite end of said runway, reversal of said elevation antenna being effective to retain the predominant energy distribution of its asymmetrical radiation pattern on the runway side of said structure.

9. For use with a precision approach radar system for guidance of aircraft operations from a site offset from an airport runway, apparatus comprising, an antenna structure disposed at said site and having substantially identical azimuth and elevation directional antennas supported thereon for sector scanning about vertical and horizontal axes respectively, said structure and both antennas being normally sited for radar coverage of a region including a glide path extending upward in the direction of one end of said runway, said azimuth and elevation antennas having similar symmetrical radiation patterns in planes perpendicular to the respective scanning axes and similar asymmetrical radiation patterns in vertical and horizontal planes respectively, said elevation antenna being arranged whereby its asymmetrical radiation pattern provides a predominant energy distribution on the runway side of said structure, means for detaching and substantially reversing the orientation of said azimuth and elevation antennas upon said antenna structure for radar coverage of a glide path extending upward in the direction of the opposite end of said runway, reversal of said elevation antenna being effective to retain the predominant energy distribution of its asymmetrical radiation pattern on the runway side of said structure, and means permitting angular adjustment of the radiation patterns of said azimuth and elevation antennas with respect to said vertical and horizontal scanning axes respectively, whereby said azimuth antenna may be tilted to provide a maximum energy component in the direction of the glide path being covered and whereby said radiation pattern of said elevation antenna may be likewise tilted toward said runway and glide path.

10. For use with a precision approach radar system for guidance of aircraft operations from a site offset from an airport runway, apparatus comprising, an antenna structure disposed at said site and having azimuth and elevation sector scanning antennas associated therewith, said azimuth antenna having a generally symmetrical radiation pattern in the horizontal plane and normally arranged for radar coverage of one end of said runway, the extent of the azimuth sector swept to the runway side of a line through said structure and parallel to the runway centerline being greater than that swept to the opposite side thereof, said elevation antenna being normally arranged for radar coverage of the same end of said runway and having an asymmetrical radiation pattern in the horizontal plane with an energy distribution predominantly to the runway side of said line through said structure, the extent of the elevation sector swept above a horizontal plane being substantially greater than that below the horizontal, and coacting means associated with said antennas and said structure permitting reorientation of said antennas with respect to said structure for radar coverage of the opposite end of said runway to the same extent, insofar as antenna energy distribution and scanning geometry, as defined aforesaid for the first mentioned end of said runway.

11. Apparatus as in claim 10 wherein said antenna structure comprises a supporting base, a housing carrying said azimuth and elevation antennas and disposed upon said base for rotation about a substantially vertical axis, and means within said housing for imparting scanning motion to said antennas.

12. Apparatus as in claim 10 wherein said antenna structure includes a plurality of supporting legs, a turntable, a housing carrying said azimuth and elevation antennas and detachably affixed to said supporting legs through said turntable, and means for aligning the scanning axes of oscillation of said azimuth and elevation antennas with respect to said runway.

13. For use with a precision approach radar system for guidance of aircraft operations from a site offset from each of a plurality of airport runways, apparatus comprising, a structure disposed at said site and supporting azimuth and elevation directional antennas, means within said structure for imparting sector scanning motion to said antennas, said azimuth antenna having a generally symmetrical radiation pattern in the horizontal plane and normally arranged for radar coverage of one end of a first of said runways, said elevation antenna being normally arranged for radar coverage of the same end of said first runway and having an asymmetrical radiation pattern in the horizontal plane with an energy distribution predominantly to runway side of said structure, means for substantially reversing the orientation of said azimuth and elevation antennas with respect to said structure for radar coverage of the opposite end of said first runway, reversal of said elevation antenna being effective to retain the predominant energy component of its asymmetrical radiation pattern on the runway side of said structure, and independent means for rotating said structure and supported antennas in unison about a substantially vertical axis, whereby such rotation and said means for reversing the orientation of said antennas permits radar coverage of any one of said plurality of runways in both directions as above noted for said first runway.

14. For use with a radar system, an antenna structure comprising first and second supporting members arranged for angular motion about substantially vertical and horizontal axes respectively, means within said structure for imparting predetermined synchronous oscillatory angular motion to each of said members, a pair of spaced studs affixed to and extending from each of said members, azimuth and elevation directional antennas each having an asymmetrical radiation pattern in one plane and a symmetrical radiation pattern in a perpendicular plane, each of said antennas having a disc-shaped supporting base formed with at least two pairs of correspondingly spaced diametrically opposed openings permitting rigid attachment of said antennas to said first and second members respectively in either of two predetermined directions relative to said structure, whereby each said antennas may be selectively arranged to sweep through either of two angular sectors without adjustment of the position of said structure.

15. Apparatus as in claim 14, wherein each of said directional antennas includes a microwave feed system having a flexible input section first and second microwave energy transmission lines extending from said housing and arranged for removable attachment to said flexible input sections of said feed systems of said azimuth and elevation antennas respectively in either of said two scanning positions.

16. Apparatus as in claim 14, wherein said azimuth and elevation directional antennas each includes a reflecting surface and a waveguide feed arrangement therefor having a flexible waveguide input section in the region of the respective supporting base, first and second like waveguide transmission lines extending from said housing in the regions of said first and second disc supporting members respectively and formed of a plurality of separable and reversible sections, and means for detachably coupling the outer ends of said first and second waveguide transmission lines to said flexible input sections of said waveguide feeds of said azimuth and elevation antennas respectively when affixed to said supporting members in either of said two positions.

References Cited in the file of this patent

UNITED STATES PATENTS

| | | |
|---|---|---|
| 2,231,929 | Layman | Feb. 18, 1941 |
| 2,415,094 | Hansen | Feb. 4, 1947 |
| 2,500,178 | Hansen | Mar. 14, 1950 |
| 2,555,101 | Alvarez et al. | May 29, 1951 |
| 2,703,842 | Lewis | Mar. 8, 1955 |

OTHER REFERENCES

Rome Air Development Center Technical Report 53-2, Development of Turntable Radar Set MT-1173 (XW-1) FPN (Rotating Base for Precision Approach Radar) by D. R. Kirshner, Griffiss Air Force Base, Rome, New York.

UNITED STATES PATENT OFFICE
CERTIFICATE OF CORRECTION

Patent No. 3,028,595                         April 3, 1962

Addison D. Cole et al.

It is hereby certified that error appears in the above numbered patent requiring correction and that the said Letters Patent should read as corrected below.

Column 2, line 1, for "to" read -- of --; column 4, line 21, before "construction" insert -- tubular --; column 13, line 26, after "two" insert -- equal --.

Signed and sealed this 7th day of August 1962.

(SEAL)
Attest:

ERNEST W. SWIDER
Attesting Officer

DAVID L. LADD
Commissioner of Patents